(12) United States Patent
Wang et al.

(10) Patent No.: US 8,842,749 B2
(45) Date of Patent: Sep. 23, 2014

(54) FLEXIBLE STRUCTURE FOR MULTIPLE-SUBCARRIER JOINT MODULATION OFDM TRANSMITTERS

(75) Inventors: Dong Wang, Ossining, NY (US); Yue Shang, Natick, MA (US)

(73) Assignee: Koninklijke Philips N.V., Eindhoven (NL)

(*) Notice: Subject to any disclaimer, the term of this patent is extended or adjusted under 35 U.S.C. 154(b) by 674 days.

(21) Appl. No.: 12/867,937

(22) PCT Filed: Mar. 9, 2009

(86) PCT No.: PCT/IB2009/050975
§ 371 (c)(1),
(2), (4) Date: Aug. 17, 2010

(87) PCT Pub. No.: WO2009/113012
PCT Pub. Date: Sep. 17, 2009

(65) Prior Publication Data
US 2010/0316153 A1      Dec. 16, 2010

Related U.S. Application Data

(60) Provisional application No. 61/035,395, filed on Mar. 11, 2008, provisional application No. 61/157,234, filed on Mar. 4, 2009.

(51) Int. Cl.
*H04K 1/10* (2006.01)
*H04L 27/26* (2006.01)
*H04L 1/00* (2006.01)
*H04L 5/00* (2006.01)

(52) U.S. Cl.
CPC .......... *H04L 5/0007* (2013.01); *H04L 27/2626* (2013.01); *H04L 1/0071* (2013.01)
USPC ........................................... 375/260; 375/295

(58) Field of Classification Search
CPC ... H04L 1/0071; H04L 5/0005; H04L 5/0007; H04W 52/0229
USPC ..................... 375/260, 295; 370/330
See application file for complete search history.

(56) References Cited

U.S. PATENT DOCUMENTS

| 8,306,130 B2 * | 11/2012 | Park et al. | 375/260 |
| 2005/0195765 A1 * | 9/2005 | Sharon et al. | 370/330 |
| 2007/0211810 A1 * | 9/2007 | Bohnke et al. | 375/260 |

FOREIGN PATENT DOCUMENTS

| WO | WO2006000091 A1 | 1/2006 | |
| WO | WO 2006/034577 A1 * | 4/2006 | H04J 1/16 |

OTHER PUBLICATIONS

L. C. Tran, A. Mertins, and T. A. Wysocki, "Quasi-orthogonal space-time-frequency codes in MB-OFDM UWB communications," Proc. International Conference on Signal Processing and Communication Systems ICSPCS2007, Dec. 2007.*

(Continued)

*Primary Examiner* — Daniel Washburn
*Assistant Examiner* — Fitwi Hailegiorgis
(74) *Attorney, Agent, or Firm* — Larry Liberchuk

(57) ABSTRACT

An orthogonal frequency division multiplexing (OFDM) multiband transmitter (200) adapted to perform multiple-subcarrier-joint-modulation (MSJM) precoding. The transmitter comprises a bit interleaver (220) for independently interleaving bit blocks and grouping bits of each interleaved bit block to bit groups; a symbol mapping unit (230) for mapping each of the bit groups to symbols according to a MSJM scheme; and a symbol interleaver (240) for allocating the symbols to data subcarriers of a plurality of consecutive OFDM symbols.

15 Claims, 4 Drawing Sheets

(56) References Cited

OTHER PUBLICATIONS

Kiyani N F et al: "OFDM with BICM-ID and Rotated MPSK Constellations and Signal Space Diversity" Communications and Vehicular Technology in the Benelux, 2007 14th IEEE Symposium on, IEEE, Piscataway, NJ, USA, Nov. 15, 2007, pp. 1-4, XP031339002.
Tran N H et al: "Multidimensional Subcarrier Mapping for Bit-Interleaved Coded OFDM With Iterative Decoding" IEEE Transactions on Signal Processing, IEEE Service Center, New York, NY, US, vol. 55, No. 12, Dec. 1, 2007, pp. 5772-5781, XP011195708.
Z. Wang et al., "OFDM or single-carrier block transmissions?," Published in IEEE Transactions on Communications, vol. 52, No. 3, pp. 380-394 Mar. 2004.
Z. Wang et al., "Linearly Precoded or Coded OFDM against Wireless Channel Fades," Published in Third IEEE Signal Processing Workshop on Signal Processing Advances in Wireless Communications, Taoyuan, Taiwan, Mar. 20-23, 2001.

* cited by examiner

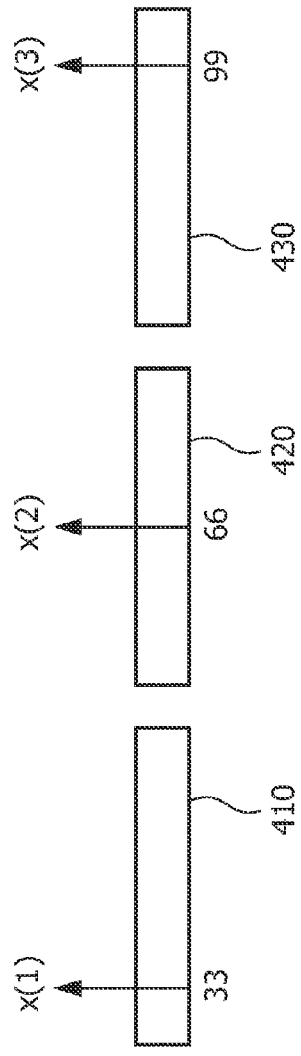

| TFC code | OFDM symbol sequence |
|---|---|
| 1, 2, 3, 1, 2, 3 | $d_0, d_1, d_2, d_3, d_4, d_5,$ |
| 1, 3, 2, 1, 3, 2 | $d_0, d_2, d_1, d_3, d_5, d_4,$ |
| 1, 1, 2, 2, 3, 3 | $d_0, d_3, d_1, d_4, d_2, d_5,$ |
| 1, 1, 3, 3, 2, 2 | $d_0, d_3, d_2, d_5, d_1, d_4,$ |
| 1, 1, 1, 1, 1, 1 | $d_0, d_1, d_2, d_3, d_4, d_5,$ |
| 2, 2, 2, 2, 2, 2 | $d_0, d_1, d_2, d_3, d_4, d_5,$ |
| 3, 3, 3, 3, 3, 3 | $d_0, d_1, d_2, d_3, d_4, d_5,$ |
| 1, 2, 1, 2, 1, 2 | $d_0, d_1, d_2, d_3, d_4, d_5,$ |
| 1, 3, 1, 3, 1, 3 | $d_0, d_1, d_2, d_3, d_4, d_5,$ |
| 2, 3, 2, 3, 2, 3 | $d_0, d_1, d_2, d_3, d_4, d_5,$ |

FIG. 5

FLEXIBLE STRUCTURE FOR MULTIPLE-SUBCARRIER JOINT MODULATION OFDM TRANSMITTERS

This application claims the benefit from U.S. Provisional Application No. 61/035,395 filed on Mar. 11, 2008 and U.S. Provisional Application No. 61/157,234 filed on Mar. 4, 2009.

The invention relates generally to orthogonal frequency division multiplexing (OFDM) communication systems and, more particularly, to precoding techniques performed by such systems.

The WiMedia standard defines the specifications of a media access control (MAC) layer and a physical (PHY) layer based on orthogonal frequency division multiplexing (OFDM) transmissions. The WiMedia standard enables short-range multimedia file transfers at rates up to 480 Mbps with low power consumption. The standard operates in a frequency band between 3.1 GHz and 10.6 GHz in the UWB spectrum.

FIG. 1 shows a block diagram of a multiband OFDM (MB-OFDM) transmitter 100 that operates in accordance with the WiMedia specification. The transmitter 100 includes a channel encoder 110, a bit interleaver 120, a symbol mapping unit 130, and an OFDM modulator 140. Typically, the transmitter 100 implements a bit-interleaved coded modulation (BICM) technique to overcome frequency selective fading of a UWB channel. With this aim, the channel encoder 110 encodes input information bits that are later interleaved at a bit level by the bit interleaver 120, and then mapped to symbols by the symbol mapping unit 130. Typically, the bit interleaver 120 performs three steps: 1) inter-OFDM-symbol interleaving, where consecutive bits are distributed to different OFDM symbols, which may be transmitted in different sub-bands; 2) intra-symbol tone interleaving, where bits are permuted across the data sub-carriers of an OFDM symbol to exploit frequency diversity; and 3) intra-symbol cyclic shift interleaving, where bits are cyclically shifted in successive OFDM symbols to exploit more frequency diversity when only one sub-band is used.

Through an inverse Fast Fourier Transform (IFFT) operation carried out by the OFDM modulator 140, the OFDM symbols are generated and transmitted through a transmit antenna 150. These OFDM symbols are transmitted either in one sub-band (FFI mode) or multiple sub-bands through a frequency hopping, which is controlled by a time frequency code (TFC). A TFC designates the sub-band or sub-bands in which the OFDM symbols should be transmitted.

The disadvantage of current WiMedia standard based systems is that the highest data rate of the WiMedia standard cannot meet future wireless multimedia applications, such as HDTV wireless connectivity. An effort is being made to increase the data rates to 1 Gpbs and above. To this end, weak channel (or non-channel) coding and higher order symbol constellation techniques have been envisioned to be used in future high data rate wireless systems. For example, the WiMedia PHY transfer rate can be increased to 960 Mbps if a ¾ convolutional code together with 16 QAM modulation are used. However, precoding of the transmitted OFDM symbols is required to ensure good performance.

The precoding technique is needed to avoid loss of frequency diversity gain resulting from the characteristics of the OFDM transmission. Generally, the precoding techniques are based on jointly modulating transmit symbols onto multiple subcarriers. This allows a receiver to recover transmit symbols even when some of these subcarriers are in deep fading. Examples of the precoding techniques can be found in "OFDM or single-carrier block transmissions?," by Z. Wang, X. Ma and G. B. Giannakis published in IEEE Transactions on Communications, vol. 52, pp. 380-394 March 2004 and in "Linearly Precoded or Coded OFDM against Wireless Channel Fades," by Z. Wang, and G. B. Giannakis published in Third IEEE Signal Processing Workshop on Signal Processing Advances in Wireless Communications, Taoyuan, Taiwan, Mar. 20-23, 2001.

The precoding is typically performed by a precoder circuit coupled to an input of the OFDM modulator 140 of a transmitter. A well-designed complex precoder can effectively exploit the frequency diversity provided by multi-path channels. However, implementing a complex precoder increases the complexity of the transmitter and receiver, as it requires more sophisticated decoding and symbol mapping techniques. For example, the use of dual carrier modulation (DCM) as a precoder requires replacing the QPSK symbol constellation with a 16 QAM symbol constellation. To guarantee full frequency diversity (i.e., diversity order of 2) in high data rate modes, a higher constellation (e.g., 256 QAM) is required.

A more efficient precoding technique is multiple-subcarrier-joint-modulation (MSJM) precoding. The MSJM precoding allows to jointly modulate multiple symbols onto multiple subcarriers while utilizing a minimum constellation size. Thus, implementing such a technique does not require designing complex and costly precoders.

Regardless of the precoding technique selected, there is a need to design new OFDM transmitters that will be able to support the selected technique. To meet the goals of short time-to-market, low cost, and backward compatibility of the new transmitters, the redesigning of new OFDM transmitters may be a blockage factor.

It would therefore be advantageous to provide a flexible multiband OFDM based transmitter structure for supporting advanced precoding techniques.

Certain embodiments of the invention include an orthogonal frequency division multiplexing (OFDM) multiband transmitter adapted to perform multiple-subcarrier-joint-modulation (MSJM) precoding. The transmitter comprises a bit interleaver for independently interleaving bit blocks and grouping bits of each interleaved bit block to bit groups; a symbol mapping unit for mapping each of the bit groups to symbols according to a MSJM scheme; and a symbol interleaver for allocating the symbols to data subcarriers of a plurality of consecutive OFDM symbols.

Certain embodiments of the invention include a method for performing a multiple-subcarrier-joint-modulation (MSJM) precoding in a multiband frequency division multiplexing (OFDM) transmitter. The method comprises arranging encoded information bits into bit blocks; independently interleaving each bit block; grouping the interleaved bits of each bit block to bit groups; mapping each of the bit groups to symbols, wherein the number of symbols is determined according to a number of jointly modulated symbols; and allocating the symbols to data subcarriers of a plurality of consecutive OFDM symbols.

Certain embodiments of the invention include a computer-readable medium having stored thereon computer executable code for performing a multiple-subcarrier-joint-modulation (MSJM) precoding in a multiband orthogonal frequency division multiplexing (OFDM) transmitter. The computer executable code causing a computer to perform the process of arranging encoded information bits into bit blocks; independently interleaving each bit block; grouping the interleaved bits of each bit block to bit groups; mapping each of the bit groups to symbols, wherein the number of symbols is determined according to a number of jointly modulated symbols; and allocating the symbols to data subcarriers of a plurality of consecutive OFDM symbols.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

FIG. 3 is a table showing exemplary values of the bit interleaver parameters;

FIG. 4 is a diagram illustrating the interleaving of symbols;

FIG. 5 is a table showing exemplary symbols sequences for different TFC codes.

Figure 1:
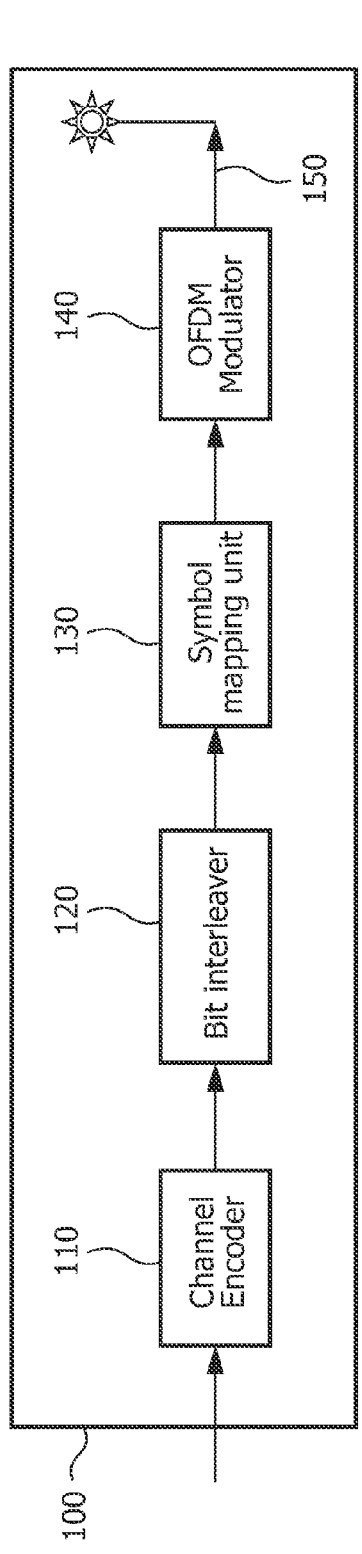
FIG. 1 is a block diagram of a multiband OFDM transmitter.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2:
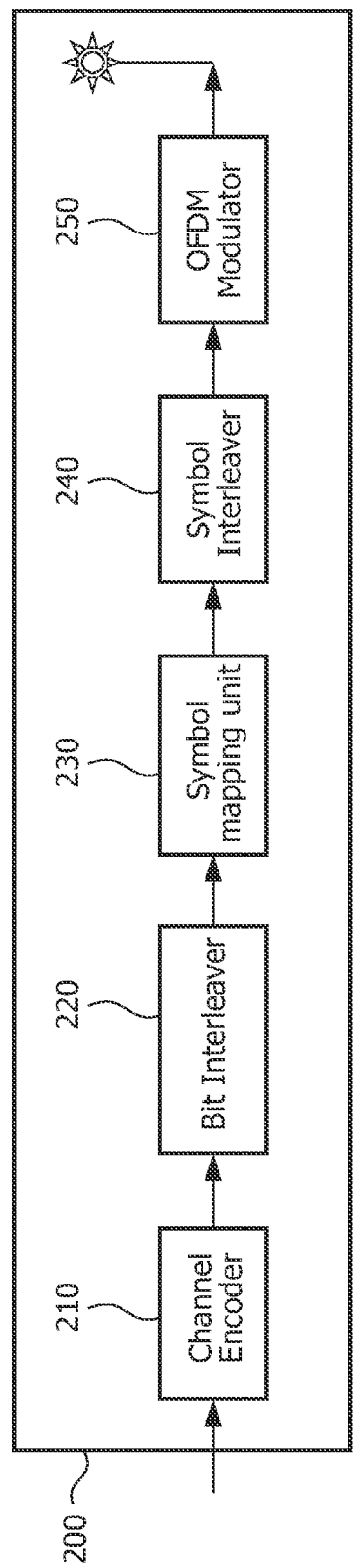
FIG. 2 is a block diagram of a multi-band OFDM transmitter implemented in accordance with certain embodiments of the invention.

FIG. 2 shows a non-limiting and exemplary block diagram of a multiband OFDM transmitter 200 implemented in accordance with certain embodiments of the invention. The transmitter 200 is based on a standard multiband OFDM transmitter and is adapted to perform the MSJM precoding described above. The transmitter 200 may support data rates of 1 Gbps and above and operate according to the specification of WiMedia 1.0, 1.5, and 2.0, WiMax, and IEEE 802.11n standards.

The transmitter 200 includes a channel encoder 210, a bit interleaver 220, a symbol mapping unit 230, a symbol interleaver 240, and an OFDM modulator 250. The channel encoder 210 and the OFDM modulator 250 have the same functionality as a standard channel encoder (e.g., encoder 110) and OFDM modulator (e.g., modulator 140) utilized in multiband OFDM transmitters. In order to support the MSJM precoding while maximizing the reusage of functional blocks of a standard multiband OFDM transmitter, the symbol interleaver 240 is added to the design, and certain parameters of the bit interleaver 220 and symbol mapping unit 230 are reconfigured.

Specifically, in accordance with principles of the invention, input information bits are encoded by the channel encoder 210. Thereafter, the encoded bits are partitioned into bit blocks, where each bit block includes 'l' bits. The bit blocks are independently interleaved by the bit interleaver 220 through the three steps mentioned above. However, in order to support high data rates, bit interleaver parameters, such as a TDS factor, a code bits/OFDM symbol ($N_{CBPS}$), a tone interleaver Block Size ($NT_{ine}$), a cyclic interleaver shift ($N_{cyc}$) are set to different values. A table showing exemplary values of such parameters for supporting data rates of 640 Mbps, 800 Mbps, and 960 Mbps is provided in FIG. 3.

When the interleaving operation is completed, the 'l' interleaved bits of a bit block are divided into a number of 'p' bit groups, where each bit group includes 'k' bits. Different grouping schemes may be used for this purpose. Following are a few non-limiting examples for the grouping schemes. In these examples, the number of bit groups 'p' equals to 200 and the number of bits 'k' in each group is 12, the i-th bit group is represented as G(i) and b(j) is the j-th bit in a bit block. One possible grouping scheme is:

$G(i)=[b*(i*12),b(i*12+1),b(i*12+2), \ldots, b(i*12+11)], i=0, 1, \ldots, 199$

Another possible grouping scheme is:

$G(i)=[b(i*4),b(i*4+1),b(i*4+2),b(i*4+3),b(400+i*4),b(400+i*4+1),b(400+i**4+2),b(400+i*4+3),b(800+i*4+0),b(800+i*4+1),b(800+i*4+2),b(800+i*4+3)], i=0, 1, \ldots, 99$ and $G(i)=[b(i*4+800),b(i*4+801),b(i*4+802),b(i*4+803),b(1200+i*4),b(1201+i*4),b(1202+i*4),b(1203+i*4),b(1600+i*4),b(1601+i*4),b(1602+i*4),b(1603+i*4)], i=100, 101, \ldots, 199$ The third grouping scheme includes:

$G(i)=[b(i*4),b(i*4+1),b(i*4+2),b(i*4+3),b(800+i*4),b(800+i*4+1),b(800+i*4+2),b(800+i*4+3),b(1600+i*4),b(1600+i*4+1),b(1600+i*4+2),b(1600+i*4+3)], i=0, 1, \ldots, 199$ It should be noted that different grouping schemes may achieve different performance. For instance, the grouping operation of the first example is simple, but it may have worse performance compared to schemes shown above. In a preferred embodiment of the invention, the bit interleaver 220 implements the third grouping scheme to achieve good performance.

The symbol mapping unit 230 maps each bit group G(i) to a number of m symbols using the MSJM precoding scheme. In a preferred embodiment, the mapping is performed using a lookup table. When utilizing the lookup table the values of the bit groups are used as table indexes to retrieve the values of the symbols. Therefore, the mapping of bit groups to symbols includes a single lookup operation. It should be noted that both the transmitter 200 and a receiver are preconfigured with the lookup table for performing the mapping and de-mapping operations. The output of the symbol mapping unit 230 includes a number of m*p symbols (or a number of p m-symbol tuple [x(i,0), . . . , x(i,m−1)]).

The symbol interleaver 240 allocates the m*p symbols to a number of 'n' data subcarriers of 's' consecutive OFDM symbols. The number 's' is an integer number that is equal to (m×p)/n. The symbol interleaver 240 distributes the 'm' symbols in the same m-symbol tuple to different subcarriers of different OFDM symbols. This is further illustrated in FIG. 4, where three OFDM symbols 410, 420, and 430 carry the symbols in the tuple [x(1), x(2), x(3)]. As an example, the symbol x(1) is carried by subcarrier 33 in the OFDM symbol 410, symbol x(2) is carried by subcarrier 66 in the OFDM symbol 420, and the symbol x(3) is carried by subcarrier 99 in the OFDM symbol 430. In a TFI mode, the OFDM symbols may be transmitted on different sub-bands, thereby maximizing the diversity gain that can be achieved.

In a preferred embodiment, the symbol interleaving is performed using an n-modulo operation ('n' is the number of data subcarriers in an OFDM symbol), and the sequence to transmit the symbols is determined according to the TFC code. Following is a non-limiting example describing a preferred symbol interleaving scheme. In this example, the number of symbols 'm' in a tuple is 3 and the number of data subcarriers 'n' is 100, the number of bit groups 'p' is 200, therefore the number of consecutive OFDM symbols 's' is 6, i.e., 3*200/100. The symbol transmitted on the q-th subcarrier of the v-th OFDM symbol is represented as $d_v(q)$, where v=0, 1, 2, 3, 4, 5 and q=0, 1, ..., 99)

$$d_0(i)=x(i,0)$$

$$d_1(i \oplus k_1)=x(i,1) \; i=0,1,2,\ldots,99$$

$$d_2(i \oplus k_2)=x(i,2)$$

and $$d_3(i-100)=x(i,0)$$

$$d_4((i-100) \oplus k_1)=x(i,1) \; i=100,1,2,\ldots,199$$

$$d_5((i-100) \oplus k_2)=x(i,2)$$

where the operation $\oplus$ denotes a module 100 addition operation, and $k_1$ and $k_2$ are two positive integers with $0 < k_1, k_2 < 100$ and $k1 \neq k2$. For example, k=33 and k2=66 can be used. It is appreciated that the above interleaving method allocates symbols x(i,0), x(i,1), x(1,2) in a 3-symbol tuple to different subcarriers (with a separation of 33 subcarriers) of different OFDM symbols. This can guarantee a good diversity gain. It should be noted that different values of $k_1$ and $k_2$ may achieve different performance. Furthermore, the transmission sequence of $d_v(q)$ is based on the TFC code being used by the transmitter 200. A table showing the transmission sequence of $d_v(q)$ for different TFC codes is provided in FIG. 5.

It should be noted that the structure of transmitter 200 as described herein is designed to support the MSJM. However, one of ordinary skilled in the art can adapt the disclosure to support other precoding techniques by the transmitter 200.

Figure 6:
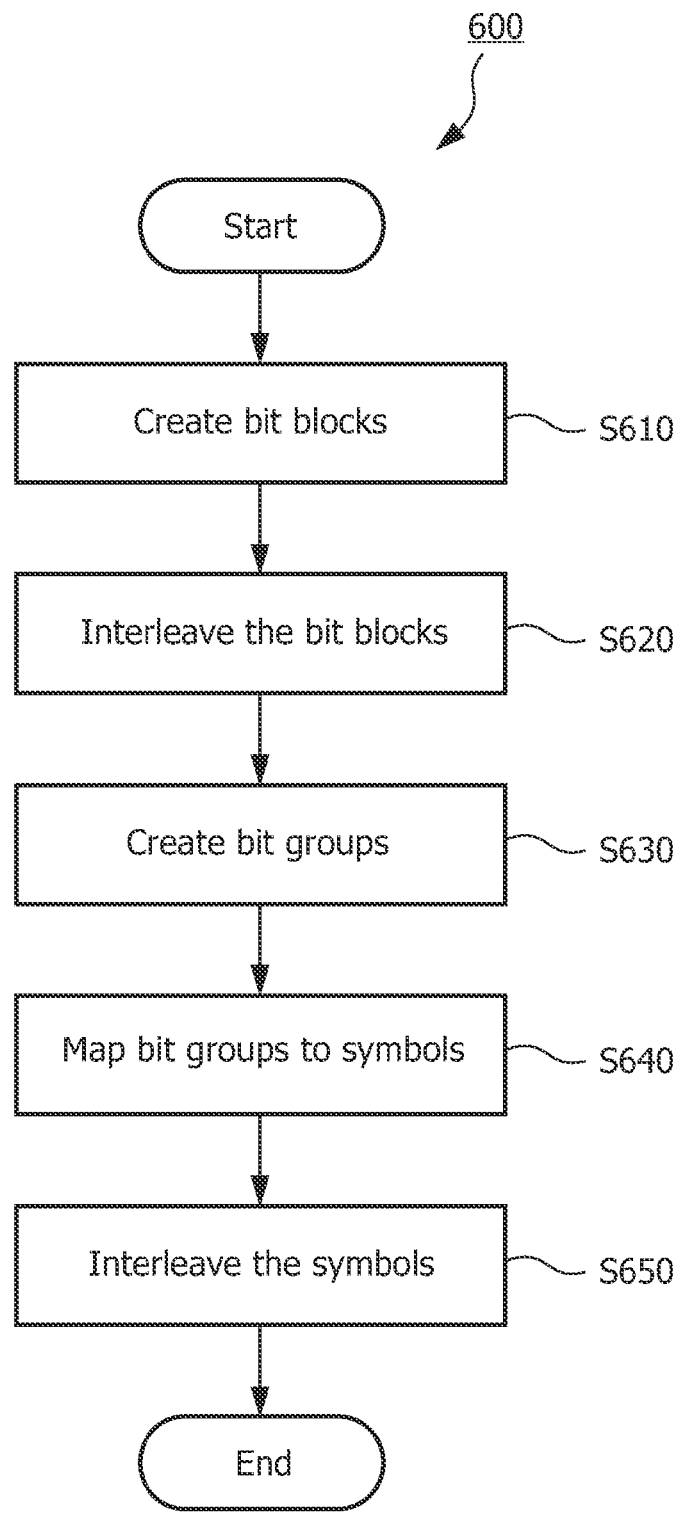
FIG. 6 is a flowchart describing an exemplary method for implementing a MSJM precoding in a multiband OFDM transmitter realized in accordance with an embodiment of the invention.

FIG. 6 shows a non-limiting flowchart 600 describing the method for implementing MSJM precoding in a multiband OFDM transmitter realized in accordance with an embodiment of the invention. At S610, encoded information bits are arranged into bit blocks, each of which includes a number of 'I' bits. In a preferred embodiment, the parameter 'I' equals to 2400 bits. At S620, each bit block is independently interleaved to output a number of 'I' interleaved bits. At S630, the interleave bits are grouped into a number of 'p' bit groups, each of which includes 'k' bits. In a preferred embodiment, 'p' equals to 200 groups and the value of 'k' is 12 bits. At S640, each bit group is mapped to a number of 'm' symbols. The mapping is performed using a lookup table in which the bit values of a bit group are used as the table indexes to retrieve the symbol values. In a preferred embodiment, the number of symbols 'm' is 3, therefore the mapping process results into 3*200=600 symbols. At S650, these symbols are allocated to a number of 'n' data subcarriers of 's' consecutive OFDM symbols according to a predefined TFC code. The allocation is performed according to symbol intereleaving scheme described in detail above. In a preferred embodiment, the value of 'n' is 100, and 's' equals to 6. When a TFC mode is used, the OFDM symbols are transmitted in different sub-bands. In a FFI mode, the symbols are transmitted in a single sub-band.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as a combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What we claim is:

1. An orthogonal frequency division multiplexing (OFDM) multiband transmitter adapted to perform multiple-subcarrier-joint-modulation (MSJM) precoding, comprising:
a bit interleaver for interleaving a bit block independently from each other bit block preceding and subsequent to said bit block, wherein the bit block and said each other bit block are included in a plurality of bit blocks, each bit block arranged from I encoded information bits, and said bit interleaver for grouping the I interleaved bits of the bit block into p different bit groups, wherein each bit group includes k interleaved bits and wherein p, k, and I are positive integers that satisfy the relationship that I is equal to p×k;
a symbol mapping unit for mapping, for each of the p bit groups of the bit block, the k bits associated with the bit group to m symbols according to a MSJM scheme; and
a symbol interleaver for allocating the m×p symbols for the bit block to n data subcarriers of s consecutive OFDM symbols, wherein m, n, and s are positive integers that satisfy the relationship that s is equal to (m×p)/n.

2. The transmitter of claim 1, further comprising a channel encoder for encoding input information bits and an OFDM modulator for modulating the plurality of consecutive OFDM symbols into a time domain signal.

3. The transmitter of claim 2, wherein the bit groups are mapped to symbols using a look-up table.

4. The transmitter of claim 3, wherein indexes of the look-up table are values of the bit groups.

5. The transmitter of claim 1, wherein the symbols are allocated to the data subcarriers using an n-modulo operation, wherein n is a number of data subcarriers in an OFDM symbol.

6. The transmitter of claim 5, wherein a transmission sequence of the plurality of OFDM symbols is determined according to a time frequency code (TFC).

7. The transmitter of claim 6, wherein the OFDM symbols are transmitted in different sub-bands.

8. A method for performing a multiple-subcarrier-joint-modulation (MSJM) precoding in a multiband frequency division multiplexing (OFDM) transmitter, comprising:
arranging I encoded information bits into a bit block;
interleaving the bit block independently from each other bit block preceding and subsequent to said bit block, wherein the bit block and said each other bit block are included in a plurality of bit blocks;
grouping the I interleaved bits of said bit block into p different bit groups, wherein each bit group includes k interleaved bits and wherein p, k, and I are positive integers that satisfy the relationship that I is equal to p×k;

mapping, for each of the p bit groups of the bit block, the k bits associated with the bit group to m symbols, wherein a number of the symbols is determined according to a number of jointly modulated symbols; and allocating the m×p symbols for the bit block to n data subcarriers of s consecutive OFDM symbols, wherein m, n, and s are positive integers that satisfy the relationship that s is equal to (m×p)/n.

9. The method of claim 8, wherein mapping the bit group to symbols is performed using a look-up table.

10. The method of claim 9, wherein indexes of the look-up table are values of the bit group.

11. The method of claim 8, wherein allocating the symbols to the data subcarriers is performed using an n-modulo operation, wherein n is a number of data subcarriers in an OFDM symbol.

12. The method of claim 11, further comprising determining a transmission sequence of the plurality of OFDM symbols according to a time frequency code (TFC).

13. The method of claim 12, wherein the plurality of OFDM symbols is transmitted in different sub-bands.

14. A non-transitory computer-readable medium having stored thereon computer executable code for performing a multiple-subcarrier-joint-modulation (MSJM) precoding in a multiband orthogonal frequency division multiplexing (OFDM) transmitter, comprising:

arranging I encoded information bits into a bit block;

interleaving the bit block independently from each other bit block preceding and subsequent to said bit block, wherein the bit block and said each other bit block are included in a plurality of bit blocks;

grouping the I interleaved bits of said bit block into p different bit groups, wherein each bit group includes k interleaved bits and wherein p, k, and I are positive integers that satisfy the relationship that I is equal to p×k;

mapping, for each of the p bit groups of the bit block, the k bits associated with the bit group to m symbols, wherein a number of the symbols is determined according to a number of jointly modulated symbols; and allocating the m×p symbols for the bit block to n data subcarriers of s consecutive OFDM symbols, wherein m, n, and s are positive integers that satisfy the relationship that s is equal to (m×p)/n.

15. The non-transitory computer-readable medium of claim 14, wherein allocating the symbols to data subcarriers is performed according to a time frequency code (TFC).

* * * * *